United States Patent
Lee et al.

(10) Patent No.: US 12,097,483 B2
(45) Date of Patent: Sep. 24, 2024

(54) EXHAUST GAS-PURIFICATION CATALYST HAVING MULTI-LAYER STRUCTURE INCLUDING PRECIOUS METAL THIN LAYER AS TOP LAYER, AND METHOD FOR PRODUCING SAME

(71) Applicant: HEESUNG CATALYSTS CORPORATION, Gyeonggi-do (KR)

(72) Inventors: Do-kyun Lee, Gyeonggi-do (KR); Sang-yun Han, Gyeonggi-do (KR); Seung Chul Na, Seoul (KR)

(73) Assignee: HEESUNG CATALYSTS CORPORATION, Gyeonggi-do (KR)

( * ) Notice: Subject to any disclaimer, the term of this patent is extended or adjusted under 35 U.S.C. 154(b) by 222 days.

(21) Appl. No.: 17/600,640

(22) PCT Filed: Mar. 31, 2020

(86) PCT No.: PCT/KR2020/004397
§ 371 (c)(1),
(2) Date: Oct. 1, 2021

(87) PCT Pub. No.: WO2020/204571
PCT Pub. Date: Oct. 8, 2020

(65) Prior Publication Data
US 2022/0203337 A1    Jun. 30, 2022

(30) Foreign Application Priority Data
Apr. 4, 2019   (KR) .................. 10-2019-0039571

(51) Int. Cl.
*B01J 23/42*   (2006.01)
*B01J 23/44*   (2006.01)
(Continued)

(52) U.S. Cl.
CPC .............. *B01J 23/44* (2013.01); *B01J 35/19* (2024.01); *B01J 37/0215* (2013.01); *F01N 3/101* (2013.01)

(58) Field of Classification Search
CPC ... B01J 23/40; B01J 23/42; B01J 23/44; B01J 35/0006; B01J 37/0215; F01N 3/101
(Continued)

(56) References Cited

U.S. PATENT DOCUMENTS 5,702,675 A * 12/1997 Takeshima ......... B01D 53/9481
423/213.7
7,056,859 B2 * 6/2006 Hachisuka ........... B01J 37/0244
502/313

(Continued)

FOREIGN PATENT DOCUMENTS

JP    2000 015097 A    1/2000
JP    2006 051431 A    2/2006
(Continued)

OTHER PUBLICATIONS

International Search Report mailed on Jul. 17, 2020 by the International Searching Authority for International Application No. PCT/KR2020/004397, filed on Mar. 31, 2020 and published as WO2020204571A1 on Oct. 8, 2020. (Applicant—Heesung Catalyst Co., Ltd.) (15 pages).

*Primary Examiner* — Cam N. Nguyen
(74) *Attorney, Agent, or Firm* — Ballard Spahr LLP

(57) ABSTRACT

Disclosed is an exhaust gas purification catalyst with a multilayered structure including an ultra-thin layer with a thickness of 20 micrometers or less and containing Rh, Pd, or both as at least one precious metal component, and to a method of manufacturing the same. The method includes a step of forming an ultra-thin layer having a thickness of 20 micrometers or less as the top layer of the catalyst by applying a polymer coating solution containing a polymer (Continued)

having a functional group capable of chelating with the precious metal component(s) on the surface of the multilayer structure of the catalyst. The disclosed catalyst exhibits improved removal efficiency for THC, CO, and NOx contained compared to an existing thin film-type catalyst. Since the disclosed catalyst is coated with a thin coating layer containing at least a portion of precious metal components, the disclosed catalyst exhibits improved performance while using the same amount of precious metal components as in conventional catalysts.

6 Claims, 4 Drawing Sheets

(51) Int. Cl.
*B01J 35/00* (2024.01)
*B01J 37/02* (2006.01)
*F01N 3/10* (2006.01)

(58) Field of Classification Search
USPC .................................................. 502/334, 339
See application file for complete search history.

(56) References Cited

U.S. PATENT DOCUMENTS

| | | | | |
|---|---|---|---|---|
| 7,759,283 | B2 * | 7/2010 | Yamato | B01J 37/0248 502/262 |
| 7,767,618 | B2 * | 8/2010 | Kang | B01J 37/0219 502/329 |
| 8,258,075 | B2 * | 9/2012 | Nochi | B01D 53/945 502/262 |
| 8,323,599 | B2 * | 12/2012 | Nunan | B01J 35/0006 60/299 |
| 8,394,348 | B1 * | 3/2013 | Nunan | B01J 35/04 60/299 |
| 8,828,900 | B2 * | 9/2014 | Takagi | B01J 37/0244 502/64 |
| 9,364,793 | B2 * | 6/2016 | Matsueda | B01J 35/023 |
| 9,675,970 | B2 * | 6/2017 | Matsueda | B01D 53/945 |
| 9,694,348 | B2 * | 7/2017 | Hoshino | B01D 53/945 |
| 9,782,753 | B2 * | 10/2017 | Aoki | B01J 23/63 |
| 10,099,204 | B2 * | 10/2018 | Hoshino | B01J 37/033 |
| 10,112,181 | B2 * | 10/2018 | Katoh | B01J 35/023 |
| 10,307,736 | B2 * | 6/2019 | Saito | B01J 21/066 |
| 10,413,885 | B2 * | 9/2019 | Suzuki | B01J 35/04 |
| 10,464,052 | B2 * | 11/2019 | Hilgendorff | B01J 23/63 |
| 10,688,476 | B2 * | 6/2020 | Onoe | B01J 23/44 |
| 10,731,532 | B2 * | 8/2020 | Suzuki | F01N 3/101 |
| 10,967,362 | B2 * | 4/2021 | Kuno | B01J 35/04 |
| 11,110,435 | B2 * | 9/2021 | Onoe | B01J 35/0006 |
| 11,286,830 | B2 * | 3/2022 | Saito | B01J 37/0244 |
| 2008/0274036 | A1 * | 11/2008 | Resasco | B01J 37/0236 423/447.2 |
| 2009/0149322 | A1 * | 6/2009 | Takeuchi | B01J 35/10 502/304 |
| 2009/0175773 | A1 * | 7/2009 | Chen | B01J 20/3021 422/177 |
| 2015/0152768 | A1 | 6/2015 | Arulraj et al. | |
| 2016/0149230 | A1 * | 5/2016 | Debe | B01J 37/0238 502/4 |
| 2019/0126247 | A1 * | 5/2019 | Deeba | B01J 37/0236 |
| 2019/0240643 | A1 * | 8/2019 | Karpov | B01J 23/44 |
| 2020/0032687 | A1 * | 1/2020 | Utschig | B01J 35/0006 |
| 2020/0391186 | A1 * | 12/2020 | Shirakawa | B01J 23/63 |

FOREIGN PATENT DOCUMENTS

| | | |
|---|---|---|
| JP | 2008 259968 A | 10/2008 |
| KR | 10-2016-0093060 A | 8/2016 |
| KR | 10-2017-0075149 A | 7/2017 |

* cited by examiner

FIG. 4

| Pre-catalyst | Example 1 | Example 2 | Example 3 | Example 4 |
|---|---|---|---|---|
| Pd – 100% + 0% | Pd – 90% + 10% | Pd – 80% + 20% | Pd – 70% + 30% | Pd – 50% + 50% |
| Min, μm | 7.65 | 6.23 | 11.27 | 10.77 |
| Max, μm | 9.27 | 8.2 | 14.0 | 22.14 |
| Average, μm | 8.61 | 7.55 | 12.99 | 16.43 |

EXHAUST GAS-PURIFICATION CATALYST HAVING MULTI-LAYER STRUCTURE INCLUDING PRECIOUS METAL THIN LAYER AS TOP LAYER, AND METHOD FOR PRODUCING SAME

CROSS-REFERENCE TO RELATED APPLICATIONS

This application is a U.S. National Phase Application of International Application No. PCT/KR2020/004397, filed Mar. 31, 2020, which claims priority to Korean Application No. 10-2019-0039571, filed Apr. 4, 2019, each of which are hereby incorporated by reference in their entirety.

TECHNICAL FIELD

The present invention relates to an exhaust gas purification catalyst having a multilayer structure including an ultra-thin layer having a thickness of 20 μm or less and containing a precious metal component of rhodium (Rh) and/or palladium (Pd), and to a method of manufacturing the same. More specifically, the present invention relates to a technique of forming an ultra-thin layer of less than 20 micrometers as the uppermost layer of an exhaust gas purification catalyst having a multilayer structure by applying a polymer coating solution having a functional group capable of chelating with precious metal components of Rh and/or Pd to the catalyst.

BACKGROUND ART

An exhaust gas purification catalyst, which is mostly a three-way catalyst, reduces harmful components such as CO, HC, and NOx contained in automobile exhaust gas through oxidation reaction with CO and HC and reduction reaction with NOx. The body of a catalyst is composed of a support or substrate made of ceramic, and a single-layer or multilayer $Al_2O_3$ washcoat formed on the substrate, and the washcoat contains precious metal components supported on alumina. In the three-way catalyst, a ternary precursor "Pt/Rh/Pd" containing Pt, Rh, and Pd is used as the precious metal component. Specifically, Pt mainly promotes an oxidation reaction that reduces CO and HC, and Rh promotes a NOx reaction. Pd is advantageous for CO and HC light-off (reaction initiation temperature) but is disadvantageous for NOx reaction and sulfur toxicity (performance degradation due to sulfur components contained in the fuel). In practice, Pd and Rh components may each exist as separate components in the precious metal components to optimize the three-way catalyst performance. That is, the Pd and Rh components may be disposed of on the three-way catalyst as individual components so that they do not form an alloy. For example, Pd and Rh exist as double layers to avoid alloying with each other or are configured to exist separately in each support even when a single layer exists. A single layer or multiple layers constituting the catalyst is formed by a conventional slurry coating method.

DISCLOSURE

Technical Problem

On the other hand, since HC light-off improvement is still required to respond to continuously strengthened exhaust gas regulation, it is needed to improve catalyst activity at low temperatures. For this reason, there is a need to concentrate a portion of the Pd component to a thin layer on the catalyst surface as an active material. However, in the case of using a conventional coating method to form a thin precious-metal coating layer as the top layer of a catalyst, it was difficult to control the coating amount and the coating shape.

Surprisingly, the inventors of the present application have found that when a polymer solution forming a composite with a precious component is used, a multilayered exhaust gas purification catalyst having an ultra-thin (for example, 20 micrometers or less thick) uppermost layer can be prepared, whereby the coating amount and coating shape can be easily controlled, resulting in improvement in catalytic performance.

Technical Solution

The present invention relates to a method of manufacturing an exhaust gas purification catalyst having a multilayer structure, the method including: forming a multilayer structure from a catalyst slurry on a substrate; and applying a coating liquid containing a precious metal on a surface of the multilayer structure. In the present invention, the coating liquid containing a precious metal is a polymer solution forming a composite with the precious metal. The polymer solution forming the composite with the precious metal has a functional group such as a hydroxyl group or an ether group that can chelate with the precious component. For example, the polymer solution may be hydroxyethyl cellulose (HEC) or polypropylene glycol.

In addition, the present invention relates to a multilayer exhaust gas purification catalyst including an uppermost layer containing a precious metal and having a thickness of 20 micrometers, the catalyst being manufactured by the above-described method.

Although not limited, the present invention relates to a three-way catalyst including a thin layer containing a precious metal component as a main component, in which the thin layer is composed of a lower layer made of Pd, a middle layer made of Rh, and an upper layer which is thin and made of Pd. Unlimitedly, in the three-way catalyst according to the present invention, the weight ratio of the Pd component in the lower layer to the Pd component in the upper layer is in a range of 50:50 to 90:10, and preferably, the thickness of the upper layer is an ultra-thin layer having a thickness of 20 μm or less.

The present invention provides a method of manufacturing a catalyst body including a thin layer containing a precious metal component, the method including the steps of: (i) producing a Pd-impregnated support and a Rh-impregnated support; (ii) mixing the impregnated supports with an additive to prepare a slurry washcoat; (iii) applying the slurry washcoat on a substrate to form a lower layer and a middle layer; and (iv) applying a polymer coating solution containing a Pd component on the middle layer to form a thin layer having a thickness of 20 μm. According to the present invention, the amount of the Pd component contained in the thin layer (upper layer or uppermost layer) is about 10% to 50% by weight of the total Pd component used in the catalyst body. The amount of 10% by weight is the minimum amount to improve the light-off to a thin layer in the three-way catalyst according to the present invention, and the amount of 50% by weight is the minimum content of Pd that should be contained in the lower layer and is the amount required to form a 20 μm-thick layer as the upper layer. In one embodiment of the present invention, palladium is used as the main component of the thin layer.

However, the main component of the thin layer is not limited to palladium (Pd), and the main component may be a Pd—Rh. The ordinarily skilled in the art also will appreciate that the Rh content and/or the Pd content used in this case may be determined in the same way as described above. In the embodiment of the present invention, palladium (Pd) is described as the precious metal component of the thin layer, but when the catalyst structure is arranged in reverse for a specific use, that is, when the Pd layer and the Ru layer are arranged in reverse order, the main compound of the thin layer may be Rh.

Advantageous Effects

The catalyst manufacturing method according to the present invention can easily form a uniform thin layer, which serves as the upper layer or the uppermost layer and was difficult to be controlled in the coating amount and shape thereof by conventional coating methods. The exhaust gas purification catalyst having a very thin layer of 20 μm or less formed by the coating method of the present invention gives improved results in THC, CO, and NOx emission compared to a catalyst that does not have a thin coating layer. Therefore, when using only a small portion of a precious metal to be used as the main component of a catalyst, to form a thin outer layer covering the surface of the catalyst body, it is possible to considerably improve the performance of a three-way catalyst while using the same amount of precious metal compared to a conventional catalyst manufacturing method.

DESCRIPTION OF DRAWINGS

FIG. 4 is a summary of the EMPA photographs and thicknesses of catalysts according to examples of the present invention.

BEST MODE

Definition

Figure 1:
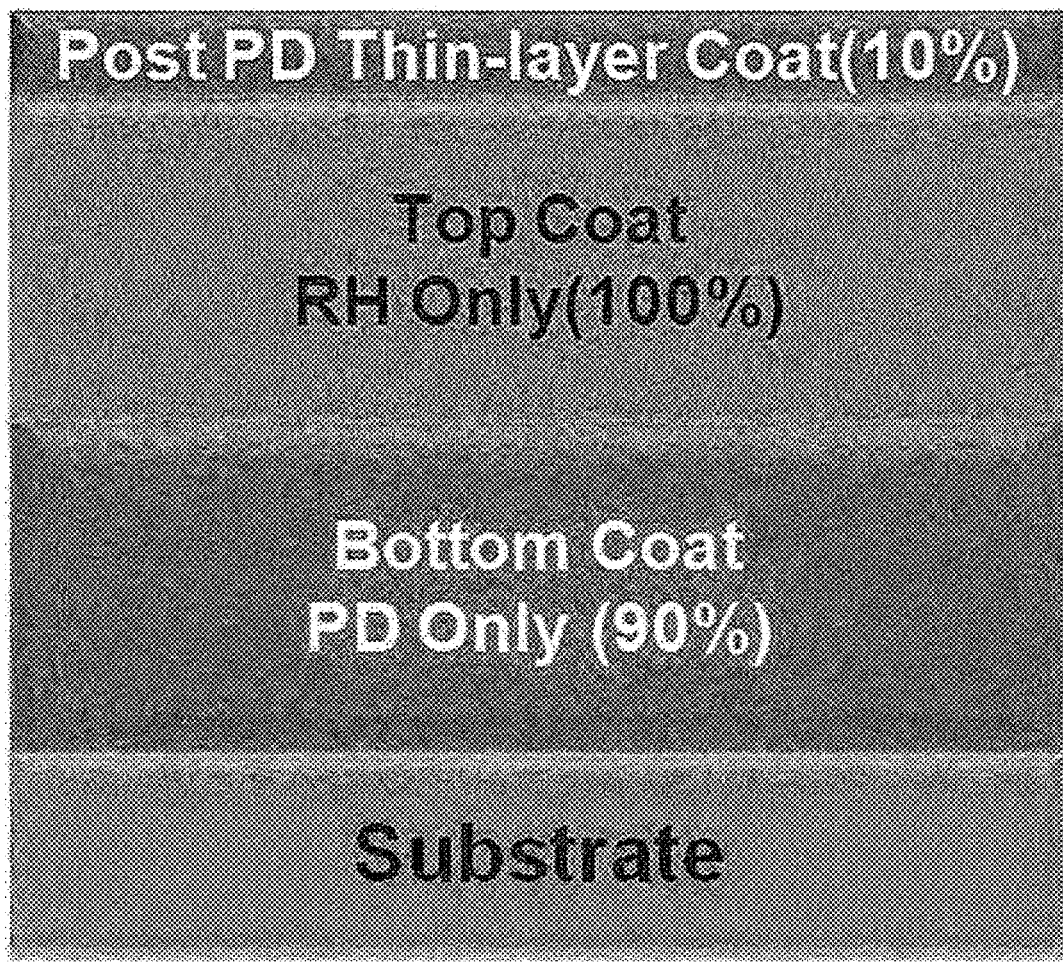
FIG. 1 is a conceptual diagram illustrating a catalyst having a thin layer containing palladium, according to one embodiment of the present invention.

The term "catalyst" as used herein refers to a powder form in which active components such as Pd and Rh are supported alumina particles serving as a catalyst support, and the term "catalyst body" refers to a structure in which the catalyst is supported on a substrate or carrier such as cordierite. The term "washcoat" refers to a slurry in which the catalyst and other components are mixed. The washcoat is applied to the substrate to form the catalyst body. However, as will be understood by those skilled in the art, the terms "catalyst" and "catalyst body" may be interchangeably used. Herein, the term "upper layer" is used in the same sense as the uppermost layer or the top layer, the term "lower layer" refers to a layer close to the substrate, and the term "middle layer" refers to a layer disposed on the lower layer. In addition, an arbitrary layer other than the upper layer will also be collectively referred to as a lower layer.

The term "heat treatment step" refers to a heating step for inducing raw material components in a precursor state into a stable structure and specifically refers to a heating process performed in an exhaust gas atmosphere. The term "exhaust gas atmosphere" refers to an environment in which exhaust gas components emitted from gasoline engines, including $O_2$, $CO_2$, CO, $H_2$, hydrocarbon (i.e., aromatic hydrocarbon (AHC), propane/propene, etc.), $NO_x$, and $H_2O$ are present. In the related art, the exhaust gas atmosphere refers to an environment in which $H_2O$ exists in an amount of 5% to 10% by weight, and the content of each of $O_2$, $CO_2$, CO, $H_2$, HC (aromatic hydrocarbon (AHC), propane/propene, etc.), $NO_x$, and $N_2$ components varies in a range of 0% to 15% by weight. As used herein, the term "pre-catalyst" refers to an unheated-state catalyst and also means a structural state in which it is not yet alloyed. Specifically, it refers to a state in which precursors are simply supported on a support.

The term "precious metal (for example, palladium) thin layer" used herein refers to a thin layer that contains not only palladium but also potentially presentable components that can be understood in the art, including inorganic oxides such as alumina and oxygen storage materials, etc. Although, many other components are included aside from palladium, the thin layer is referred to as a Pd thin layer for convenient description.

With respect to the arrangement of Pd and Rh among the three-way catalytic precious metal components, Pd and Rh are present as separate components in an art-accepted composition. That is, Pd and Rh are arranged not to be close or adjacent to each other when constituting a catalyst. For example, Pd is supported on a catalyst support and thermally fixed, and Rh is supported on another catalyst support and thermally supported. Each of the precious metal components is prepared as a washcoat, the washcoats are mixed with cordierite or coated as a multilayer structure on cordierite to produce a three-way catalyst body. The catalyst body is mounted on a vehicle exhaust system through canning.

The concept of a thin precious-metal layer introduced herein can be applied to the configuration of a conventional three-way catalyst. Namely, regardless of the configuration of an underlying layer disposed under the precious metal thin layer, a portion of Pd required for a catalyst is used to form an upper thin layer, the performance of a three-way catalyst is improved. In this case, the proportion of the total Pd used to form the upper thin layer with respect to the overall amount of Pd used to constitute the catalyst may be in a range of 10% to 50% by weight, and the thickness of the thin upper layer needs to be 20 μm or less.

In addition, the inventors of the present application have found that in forming a thin Pd layer as the uppermost layer of the catalyst, the target coating amount and coating shape cannot be achieved by the conventional coating method. For example, the Pd content distribution exceeded the reference value, or the coating shape could not be maintained uniformly. Accordingly, an exhaust gas purification catalyst with a thin layer was prepared by using a new coating method referred to as Post PGM Thin-layer Coat (PPTC). Briefly, after preparing a double-layer pre-catalyst using a conventional method, a portion of the precious metal component constituting the catalyst, such as a portion of the Pd component forming the lower layer, is included in the polymer coating solution and then coated on the top of the double-layer pre-catalyst by a conventional method. The coating solution may permeate into a surface layer (20 μm or less) of the three-way catalyst to form a precious metal thin layer.

Hereinafter, the present invention will be described in detail with reference to examples, but it is clear that the spirit of the present invention is not limited thereto. For example, in a three-way catalyst manufactured according to the present invention, a Pt component may be included as the precious metal component of the lower layer. To simply and concisely describe the thin film properties of the upper layer in the present application, only Pd and Rh components are described. Pd and Rh components in the lower layer may be present in the form of non-alloy or alloy. However, in the embodiments described below, a Pd/Rh double layer structure will be described. In addition, the coating solution containing Pd is a polymer solution that forms a composite with palladium (Pd). Although not bound by theory, the coating solution may be hydroxyethyl cellulose (HEC) or polypropylene glycol having a functional group, such as a hydroxyl group or an ether group, capable of chelating with Pd. However, the coating solution is not limited thereto.

Pre-Catalyst

The catalyst support $Al_2O_3$ powder was impregnated with aqueous Pd nitrate and aqueous Rh nitrate. The alumina powder was dried in an oven at 150° C. for 5 hours and calcinated at a temperature in the range from 400° C. to 650° C. for 5 hours to prepare a pre-catalyst powder. Slurry was prepared using the obtained pre-catalyst powder. The slurry was applied on the substrate using a conventional coating method (secondary coating step) and the substrate was heat treated in a reduction gas environment (i.e., exhaust gas ambient) at a temperature in the range from 500° C. to 1100° C., preferably, for 12 hours to obtain a pre-catalyst body.

Comparative Example

Figure 2A:
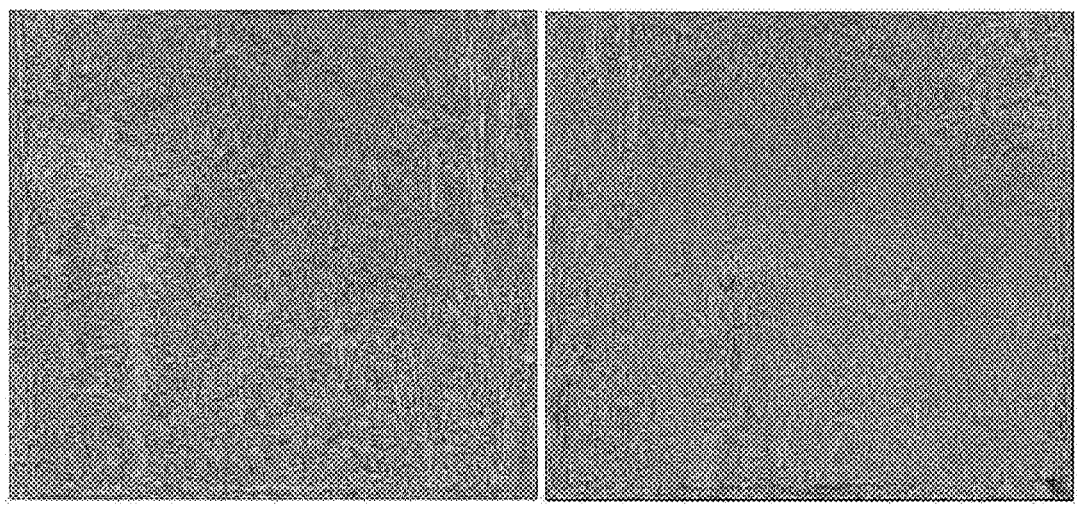
FIG. 2A is a diagram illustrating an upper layer that is formed by a conventional coating method, in which the upper layer is not even due to a capillary phenomenon.

Alumina was impregnated with a Pd aqueous solution, dispersed in a solvent, and milled to prepare Pd slurry. The Pd slurry was coated on the pre-catalyst body by a conventional coating method to form a thin layer, dried, and calcinated to obtain a catalyst body. In this comparative example, the amount of Pd used to form the thin layer was 10% by weight with respect to the total amount of Pd used to form the catalyst body. Specifically, 90% by weight of the Pd component was used to form the lower layer of the pre-catalyst, and the remaining 10% by weight of the Pd component was used to form the thin layer (i.e., upper layer). Here, the thickness of the upper layer made of Pd was 28 μm, and the coating amount was 10 g/L. The deviation in the thickness of the upper coating layer exceeded a reference value, and the coating shape was not uniform (refer to FIG. 2A).

Example 1

Figure 2B:
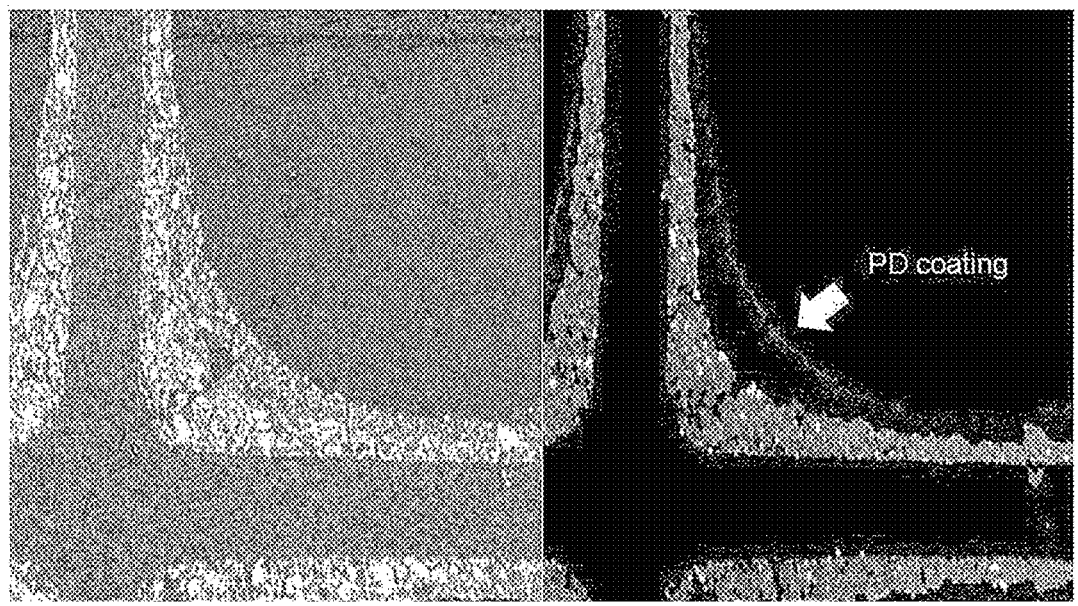
FIG. 2B is a photograph taken by an electron probe microanalyzer (EPMA) and showing a uniform precious metal thin film upper layer formed by the coating method according to the present invention.

A Pd aqueous solution was dispersed in a commercially available polypropylene glycol solution, and the solution mixture was applied on the pre-catalyst body to form a thin coating layer, dried, and calcinated to form a catalyst body (see FIG. 2B, the thickness of the upper Pd coating layer was 8.61 μm, and the amount of Pd contained in the upper coating layer was 10% by weight with respect to the total amount of Pd used for the catalyst body). In this case, the Pd content in the thin layer was the same method as in Comparative Example.

Example 2

A catalyst body was prepared in the same manner as in Example 1 except that the Pd content used in the thin layer was 20% by weight with respect to the total amount of Pd used for the catalyst body.

Example 3

A catalyst body was prepared in the same manner as in Example 1 except that the Pd content in the thin layer was 30% by weight with respect to the total amount of Pd used for the catalyst body.

Example 4

A catalyst body was prepared in the same manner as in Example 1 except that the Pd content in the thin layer was 50% by weight with respect to the total amount of Pd used for the catalyst body.

The constructions of the thin layers (i.e., upper layers) of Comparative Example and Examples are summarized in Table 1 below.

TABLE 1

| Upper layer (thin layer) | Amount of Pd in upper layer (thin layer) (% by weight) | Thickness (μm) and shape of upper layer (thin layer) |
|---|---|---|
| Comparative example | 10 | 28, not-uniform |
| Example 1 | 10 | 8.61, uniform |
| Example 2 | 20 | 7.55, uniform |
| Example 3 | 30 | 12.99 uniform |
| Example 4 | 50 | 16.43 uniform |

Figure 3:
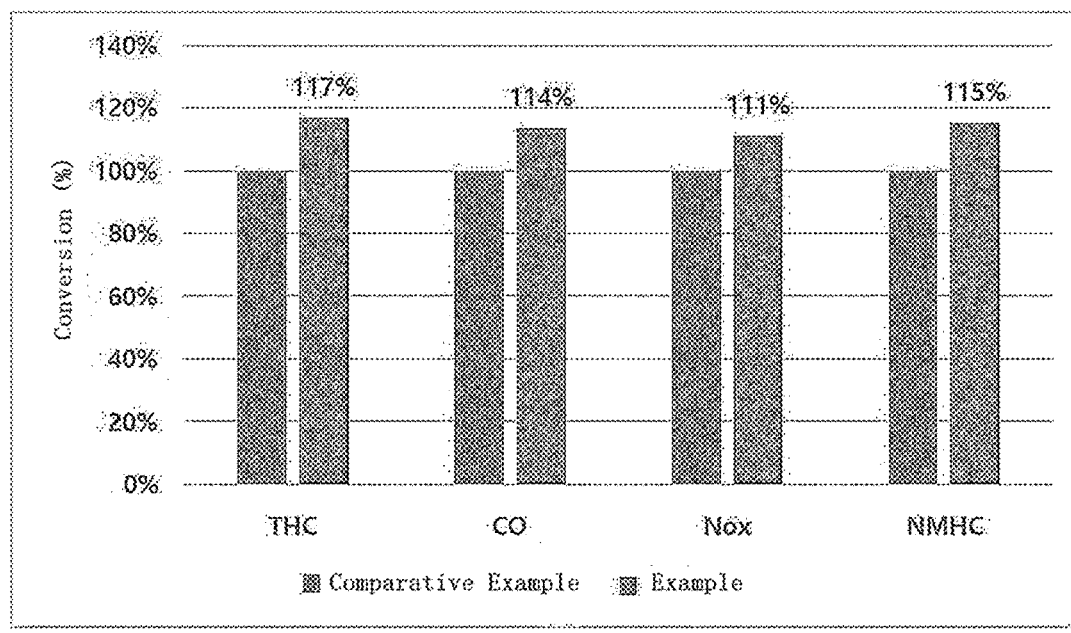
FIG. 3 is a result of comparison between performance a Pd/Rh bilayer three-way catalyst and performance of a Pd(90%)/Rh(100%) multilayer three-way catalyst with a Pd thin layer (10%) according to the present invention.

The photographs and thickness observed at 400-fold magnification using an electron probe microanalyzer (SPMA) are shown in FIG. 4. The vehicle evaluation results for the catalyst body prepared in Example 1 are shown in FIG. 3. The catalyst body of Example 1 showed the better results than Comparative Example in terms of the concentrations of HC, CO, and NOR. Therefore, it was confirmed that the performance of the three-way catalyst was greatly improved when a portion of the total amount of a precious metal used for the three-way catalyst was used to form a thin film serving as the uppermost layer of the three-way catalyst while using the same amount of the precious metal for the three-way catalyst.

The invention claimed is:

1. A method of producing an exhaust gas purification catalyst having a multilayered structure, the method comprising:
    forming a pre-catalyst body having a multilayered structure on a substrate using a catalyst slurry; and
    applying a coating solution consisting of a precious metal aqueous solution and a polymer onto a surface of the pre-catalyst body, thereby producing an exhaust gas purification catalyst having a multilayered structure.

2. The method of claim 1, wherein the polymer forms a composite with the precious metal in the precious metal aqueous solution.

3. The method of claim 2, wherein the polymer has a functional group capable of chelating with the precious metal in the precious metal aqueous solution.

4. The method of claim 3, wherein the functional group is a hydroxyl group or an ether group.

5. The method of claim 2, wherein the polymer is hydroxyethyl cellulose (HEC) or polypropylene glycol.

6. The method of claim 1, wherein the precious metal in the precious metal aqueous solution comprises Pd.

\* \* \* \* \*